US006968034B2

(12) United States Patent
Ellengogen

(10) Patent No.: US 6,968,034 B2
(45) Date of Patent: *Nov. 22, 2005

(54) X-RAY INSPECTION SYSTEM

(75) Inventor: Michael P. Ellengogen, Wayland, MA (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 361 days.

This patent is subject to a terminal disclaimer.

(21) Appl. No.: 10/115,443

(22) Filed: Apr. 3, 2002

(65) Prior Publication Data

US 2002/0172324 A1 Nov. 21, 2002

Related U.S. Application Data

(60) Provisional application No. 60/281,117, filed on Apr. 3, 2001.

(51) Int. Cl.[7] ............................ G01N 23/04; H05G 1/02
(52) U.S. Cl. .......................... 378/57; 378/189; 378/197
(58) Field of Search ............................... 378/21, 22, 23, 378/24, 25, 26, 43, 53, 54, 55, 57, 87, 88, 378/89, 90, 189, 195, 196, 197, 62, 98.6, 378/98.12, 146, 181

(56) References Cited

U.S. PATENT DOCUMENTS

| 5,367,552 A | | 11/1994 | Peschmann | |
|---|---|---|---|---|
| 5,642,393 A | | 6/1997 | Krug et al. | |
| 5,699,400 A | * | 12/1997 | Lee et al. | 378/57 |
| 5,796,802 A | | 8/1998 | Gordon | |
| 5,970,113 A | | 10/1999 | Crawford et al. | |
| 6,028,910 A | * | 2/2000 | Kirchner et al. | 378/22 |
| 6,088,423 A | * | 7/2000 | Krug et al. | 378/57 |
| 6,200,024 B1 | * | 3/2001 | Negrelli | 378/197 |
| 6,218,943 B1 | * | 4/2001 | Ellenbogen | 340/572.4 |
| 6,359,961 B1 | * | 3/2002 | Aufrichtig et al. | 378/41 |
| 6,373,917 B1 | * | 4/2002 | Roder | 378/22 |
| 6,435,715 B1 | * | 8/2002 | Betz et al. | 378/197 |
| 6,442,233 B1 | * | 8/2002 | Grodzins et al. | 378/57 |
| 6,459,760 B1 | * | 10/2002 | D'Ambrosio | 378/43 |
| 6,463,121 B1 | * | 10/2002 | Milnes | 378/62 |
| 6,556,653 B2 | * | 4/2003 | Hussein | 378/90 |
| 2002/0176531 A1 | * | 11/2002 | McClelland et al. | 378/57 |

* cited by examiner

Primary Examiner—Allen C. Ho
(74) Attorney, Agent, or Firm—Wolf, Greenfield & Sacks, P.C.

(57) ABSTRACT

An X-ray inspection system and methodology is disclosed. The system comprises a conveyor, an X-ray source that exposes an item under inspection to X-ray radiation and at least one X-ray detector that detects X-ray radiation modified by the item. The X-ray source and X-ray detector may be movable in any of first and second dimensions. The X-ray source may also be moved in a third dimension to zoom in and out on regions of interest in the item order inspection. The system further comprises a controller that controls movement of the X-ray source and X-ray detector, independently of each other, in any of collinear and different directions, to provide a plurality of X-ray views of the item at varying examination angles of the X-ray radiation. A processor coupled to the controller may be configured to receive and process detection information from the X-ray detector and to provide processed information to an operator interface. The operator interface may also receive instructions from an operator input and provide the instructions to the controller.

39 Claims, 10 Drawing Sheets

AMORPHOUS SILICON PLATE DETECTOR

NOMINAL IMAGE

ZOOM

X-RAY INSPECTION SYSTEM

CROSS REFERENCE TO RELATED APPLICATIONS

This application claims priority under 35 U.S.C. §119(e) to U.S. Provisional Application Ser. No. 60/281,117, entitled "X-RAY INSPECTION SYSTEM," filed on Apr. 3, 2001 (not published), which is herein incorporated by reference in its entirety.

BACKGROUND

1. Field of the Invention

The invention relates to X-ray inspection systems for examination of items such as baggage or packages. More specifically, the invention relates to an X-ray inspection system and method, that utilizes X-ray radiation modified by the item under inspection to detect, for example, weapons, drugs, explosives, or other contraband.

2. Discussion of Related Art

X-ray baggage inspection systems typically operate by exposing an item of baggage to X-ray radiation and detecting the X-ray radiation that is transmitted through or scattered from the examined baggage. Some systems have used a single view source detector arrangement, while others have used dual view or multi-view arrangements. The single or dual view systems usually scan baggage as it moves on a conveyor, using a fan or scanning pencil beam of X-ray radiation in a fixed geometry. Multi-view systems such as Computed Tomography (CT) systems usually perform a 360° scan of stationary baggage, and process data corresponding to absorption of the X-ray radiation from different scan angles to reconstruct a three-dimensional image of the baggage.

At airports, the baggage inspection procedure may be divided into a number of levels of inspection. A level one system may process baggage rapidly, such as at a targeted rate of approximately 1500 bags per hour. The level one system may be located at a first inspection station and may inspect all baggage. The level one system may rapidly scan baggage using some detection methodology, to eliminate non-suspicious baggage. This methodology may determine a property of materials within the baggage, such as, for example, mass density, or effective atomic number, or may employ Compton X-ray scatter, ion mass spectroscopy, or other detection techniques. The number of bags that are not cleared (that are rejected) by a level one system may range from 10%–50% of the total number of bags, depending on the detection methodology and threat thresholds used in the particular system.

In a multi-level system, the bags rejected by the level one system may be automatically sent to a level two area where an operator may visually inspect an X-ray image of the bag. The operator may search the image of the bag for characteristic objects, such as weapons, wires, explosives, etc., and may attempt to determine whether a suspicious object within the bag may be cleared based on its obvious shape. The operator at a level two station may clear most, but not all of the rejected bags. The remaining baggage may be on the order of, for example, 0.1%–0.5% of the initial stream, and may be sent to a level three inspection station. At the level three station, the bag may be inspected with a slower inspection device, than a level one system, that may use a different detection methodology to the level one system.

One example of a level three inspection device may be a CT scanner. CT scanners are usually successful in identifying explosives inside a bag when the explosives are present in large amount. The CT scanner may measure the mass density of the examined object. The CT scanner may be set up to communicate with the level one system in order to interrogate a specific object or region of interest, that was identified in the bag by the level one system. However, CT scanners can be expensive and slow.

Another example of a device that may be used as a level three detection device may be a multi-probe tomography system such as that described in U.S. Pat. No. 5,642,393, herein incorporated by reference.

On average, a level three device may tend to clear less than half of the objects it inspects. Thus, approximately 0.05%–0.25% of the baggage may need to be sent to a level four area. A level four area may be defined as reconciliation of the bag with the owner, which may often be difficult. If reconciliation is not possible, the bag may be confiscated and additional problems may arise, such as, termination of the flight that the bag was to be on.

While the above system can perform adequately, there is still a need for a device that may be used, for example, as a level three device that can reliably detect various explosives and other contraband having different shapes and locations in the item under inspection.

SUMMARY OF THE INVENTION

One embodiment is directed toward an X-ray inspection system comprising an X-ray source located at an inspection region that exposes an item under inspection to X-ray radiation and that is constructed and arranged to be movable in any of the first dimension, a second dimension, and a third dimension. The system further comprises an X-ray detector located at the inspection region that detects X-ray radiation as modified by the item under inspection, and that is constructed and arranged to be movable in the first dimension and the second dimension. The system further comprises a controller coupled to each of the X-ray source, the X-ray detector, that controls movement of the X-ray source in the first and second dimensions, the X-ray detector in the first and second dimensions, and a processor coupled to the controller that is configured to receive detection information from the X-ray detector, to process the detection information, and to provide processed information. The controller is also configured to control movement of the X-ray source and the X-ray detector, independently of each other, in any of collinear directions and different directions, to provide a plurality of X-ray views of the item under inspection at varying examination angles of the X-ray radiation.

According to another embodiment, the controller is additionally configured to control movement of the X-ray source in the third dimension so as to provide varying levels of zoom of the processed information to the operator interface.

According to another embodiment, the system also comprises an operator interface, coupled to the controller and the processor, that is configured to receive instructions from an operator input, to provide the instructions to the controller to control movement of any of the X-ray source, the X-ray detector and the conveyor, and that is configured to receive the processed information and present the processed information to an operator.

According to another embodiment, the processor is additionally configured to process the plurality of X-ray views to create a tiled scout view of the item under inspection and to provide the tiled scout view to the operator interface.

According to another embodiment, the processor is further configured to receive information about the item under inspection from a remote inspection device, and to locate a region of interest in the item under inspection based on the information received.

Another embodiment is directed toward an X-ray inspection system comprising an X-ray source located at an inspection region that exposes an item under inspection to X-ray radiation and that is constructed and arranged to be movable in any of the first dimension, a second dimension, and a third dimension. The system further comprises an X-ray detector located at the inspection region that detects X-ray radiation as modified by the item under inspection, and that is constructed and arranged to be movable in the first dimension and the second dimension. The system further comprises a controller coupled to each of the X-ray source, the X-ray detector, that controls movement of the X-ray source in the first and second dimensions, the X-ray detector in the first and second dimensions, and a processor coupled to the controller that is configured to receive detection information from the X-ray detector, to process the detection information, and to provide processed information. The controller is additionally configured to control movement of the X-ray source in the third dimension so as to provide varying levels of zoom of the processed information to the operator interface.

According to another embodiment, the controller is also configured to control movement of the X-ray source and the X-ray detector, independently of each other, in any of collinear directions and different directions to provide a plurality of X-ray views of the item under inspection at varying examination angles of the X-ray radiation.

According to another embodiment the system also comprises an operator interface, coupled to the controller and the processor, that is configured to receive instructions from an operator input and to provide the instructions to the controller to control movement of any of the X-ray source, the X-ray detector and the conveyor, and that is configured to receive the processed information and present the processed information to an operator.

A further embodiment is directed toward a high resolution X-ray inspection system comprising a high resolution X-ray source located at an inspection region that exposes an item under inspection to X-ray radiation. The high resolution source has a focal spot size that is less than approximately 100 $\mu$m, and is constructed and arranged to be movable in any of the first dimension, a second dimension, and a third dimension. The system further comprises an X-ray detector located at the inspection region that detects X-ray radiation as modified by the item under inspection, and that is constructed and arranged to be movable in the first dimension and the second dimension, and a controller. The controller is coupled to each of the X-ray source, the X-ray detector, and controls movement of the X-ray source in the first and second dimensions, and movement of the X-ray detector in the first and second dimensions. The system further comprises a processor that is configured to receive detection information from the X-ray detector, to process the detection information, and to provide processed information.

Another embodiment comprises an operator interface that is coupled to the controller and the processor, and is configured to receive instructions from an operator input, to provide the instructions to the controller to control the movement of any of the X-ray source, the X-ray detector and the conveyor, and is configured to present the processed information to an operator.

Another embodiment is directed toward a method of inspecting an item with an X-ray system, the method comprising acts of exposing an item to X-ray radiation from an X-ray source, detecting the X-ray radiation, as modified by the item, with an X-ray detector, processing information provided by the X-ray detector to provide processed information, and providing the processed information. The method further comprises acts of moving the X-ray source in any of a first dimension and a second dimension to expose the item to X-ray radiation at a plurality of positions, and moving the X-ray detector, independently of the X-ray source, in any of the first dimension and the second dimension to detect the X-ray radiation at a plurality of positions, so as to provide the processed information at a plurality of examination angles.

According to another embodiment, the method further comprises an act of moving the X-ray source in a third dimension so as to provide varying levels of zoom of the processed information to the operator interface.

According to another embodiment, the act of processing the information comprises creating a tiled scout view of the item from X-ray images obtained at each the plurality of positions, and wherein the act of providing the processed information comprises providing the tiled scout view to the operator interface.

According to another embodiment, the method further comprising acts of receiving, from a remote inspection device, information about the item and locating a region of interest in the item based on the information received.

Another embodiment is directed to a method of inspecting an item with an X-ray system, comprises acts of exposing an item to X-ray radiation from an X-ray source, detecting the X-ray radiation as modified by the item with an X-ray detector, processing information provided by the X-ray detector to provide processed information, and providing the processed information. The method further comprises acts of moving the X-ray source in any of a first dimension and a second dimension to expose the item to X-ray radiation at a plurality of positions, moving the X-ray detector in any of the first dimension and the second dimension to detect the X-ray radiation at a plurality of positions, and moving the X-ray source in a third dimension so as to provide varying levels of zoom of the processed information.

Another embodiment is directed to a method of inspecting an item with an X-ray system, comprising acts of exposing an item to X-ray radiation from an X-ray source having a focal spot size of less than approximately 100 $\mu$m, detecting the X-ray radiation as modified by the item with an X-ray detector, processing information provided by the X-ray detector to provide processed information. The method further comprises acts of moving the X-ray source in any of a first dimension and a second dimension to expose the item to X-ray radiation at a plurality of positions, and moving the X-ray detector in any of a first dimension and a second dimension to detect the X-ray radiation at a plurality of positions.

BRIEF DESCRIPTION OF THE DRAWINGS

The accompanying drawings, which are herein incorporated by reference, are not intended to be drawn to scale. In the drawings, each identical or nearly identical component that is illustrated in various figures is represented by a like numeral. For purposes of clarity, not every component may be labeled in every drawing. In the drawings:

FIG. 4a is a perspective view of an exemplary embodiment of an X-ray detector that may be used in the X-ray inspection system of FIG. 2;

FIG. 4b is a top plan view of the exemplary X-ray detector of FIG. 4a;

DETAILED DESCRIPTION

In general, the X-ray inspection system disclosed herein can be used to detect different types of contraband (for example, weapons, drugs, money, plastic explosives, or other types of explosives) that may be present in items such as baggage or packages, by detecting X-ray radiation transmitted through and/or scattered from the item. However, it is to be appreciated that the X-ray inspection system is not so limited, and may be used in a number of ways, such as, non-destructive testing of parts, and the like.

Figure 1:
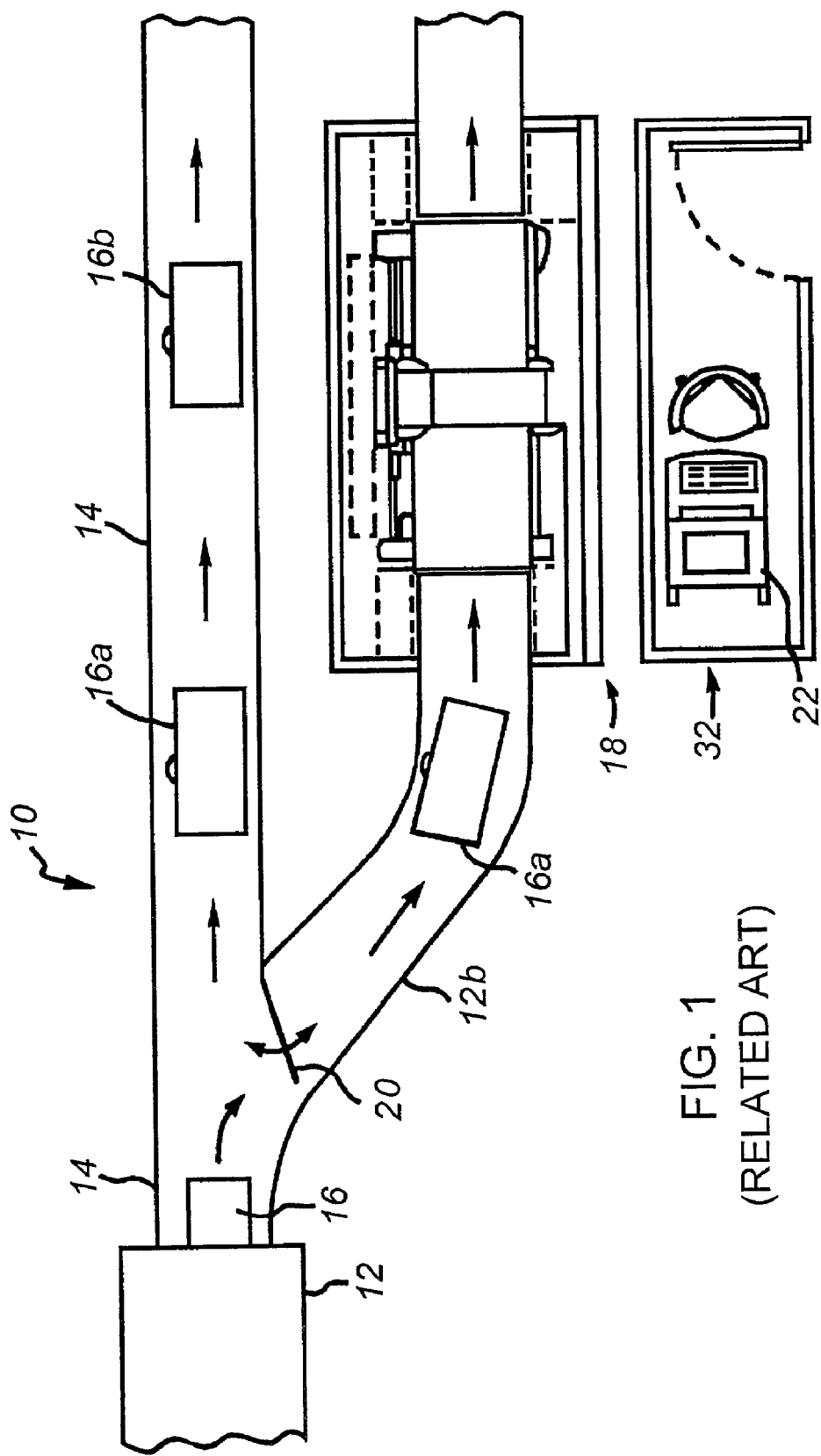
FIG. 1 is an illustration of a multi-level inspection system of the related art.

Referring to FIG. 1, there is illustrated a multi-level inspection system 10 as is known in the related art. It includes a first inspection device 12, which may be, for example, a level one or level two X-ray inspection system, which examines items being transported on a conveyor 14. When the inspection device 12 examines an item 16 and determines that the item is free of any questionable regions of interest that could contain, for example, contraband such as drugs or explosives, the item (for example, items 16a, 16b), may be automatically directed by an item director 20 in communication with the inspection device 12, to proceed further along conveyor 14. If inspection device 12 detects a questionable region of interest within an item 16, the item director 20 may direct item 16c along conveyor 14b to an X-ray inspection system 18, which may be, for example, a level three X-ray inspection system, such as the X-ray inspection system disclosed infra. The X-ray inspection system 18 may be coupled to an operator interface 22 located at remote location 32, where an operator can oversee the inspection process, evaluate data detected and processed by the X-ray inspection system 18, and direct operation of the X-ray inspection system 18. It is to be appreciated that although the X-ray inspection system may be interfaced for operator control, the X-ray inspection system may also be configured to automatically evaluate and determine whether region of interest in an item under inspection is cause for concern.

Figure 2:
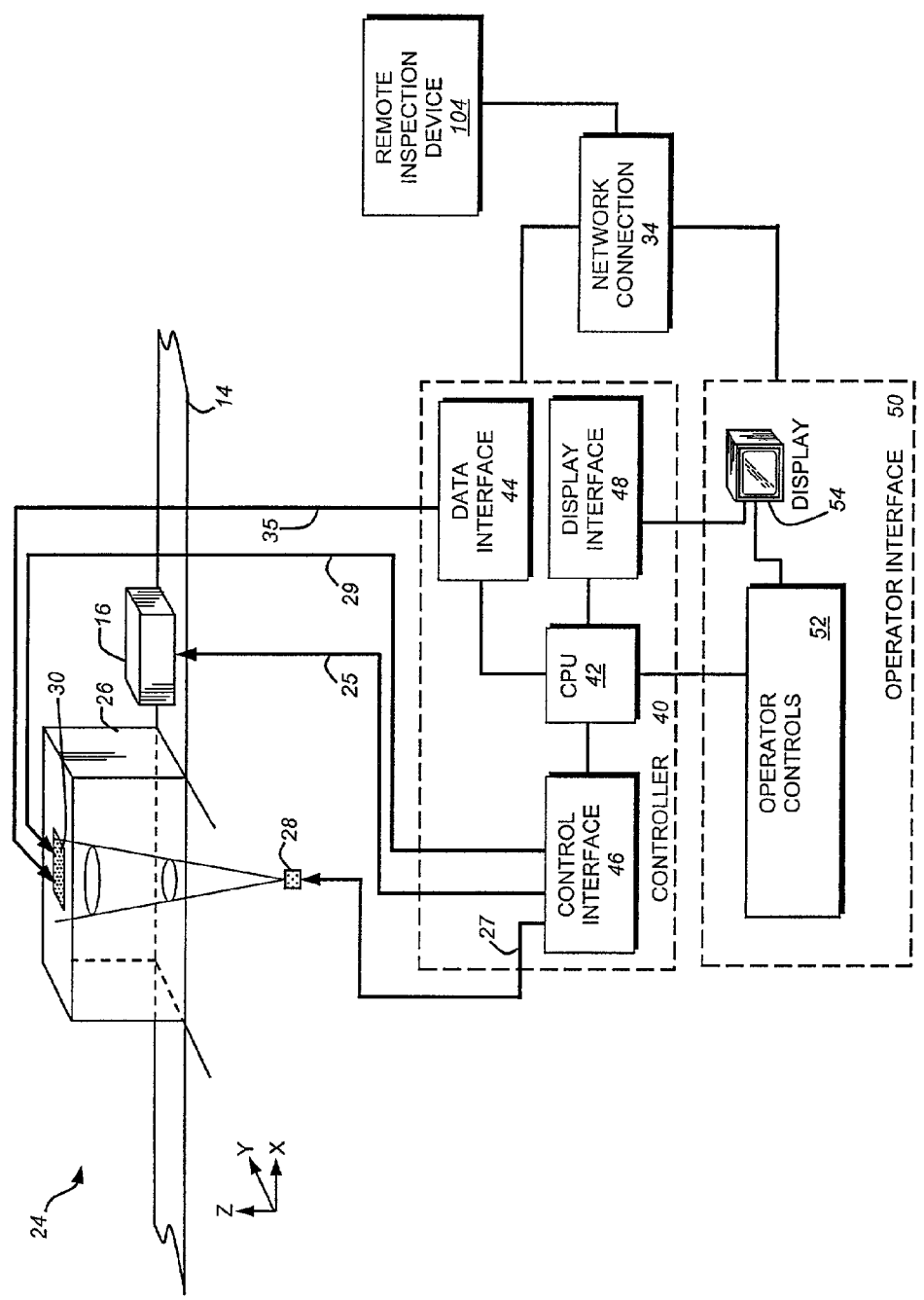
FIG. 2 is a schematic illustration of an X-ray inspection system according to one embodiment.

FIG. 2 is a schematic view of one embodiment of an X-ray inspection system 24 that may be used, for example, as a level three X-ray inspection device as described above. An item under inspection 16 may be transported on a conveyor 14 to an inspection region 26. The conveyor 14 may be halted so that the item under inspection 16 is stationary during the examination process, or it may continue moving. The movement of the item by conveyor 14, in response to a control signal on line 25, may be under operator control, such as via operator interface 50, or automatic control by controller 40. Once the item under inspection 16 is at inspection region 26, it may be exposed to X-ray radiation from an X-ray source 28. An X-ray detector 30 may be located at the inspection region 26 to detect X-ray radiation either transmitted through, or scattered by, the item under inspection 16. In the embodiment illustrated in FIG. 2, the X-ray detector 30 may be located at an opposite side of the conveyor 14 from the X-ray source 28, to detect attenuation of the X-ray radiation transmitted by the X-ray source 28 through the item under inspection 16.

The conveyor 14, the X-ray source 28, and the X-ray detector 30 may be coupled to controller 40, which may independently control movement of the X-ray source 28, by a control signal on line 27, in any and all of a first (x), second (y), and third (z) dimension, may independently control movement of the X-ray detector 30, by a control signal on line 29, in any and all of the first (x) and second (y) dimensions, and may independently control movement of the conveyor 14 in the first (x) dimension in response to a control signal on line 25. The controller 40 may also control the times at which the X-ray source 28 emits X-ray radiation. The controller 40 may further be configured to receive detection information from the X-ray detector 30 on line 35, to process the detection information, and to provide processed information. It is to be appreciated that although one embodiment of a system for measuring an item under inspection is illustrated in FIG. 2, various alterations and modifications readily apparent to one of skill in the art are also within the scope of this disclosure even though each and every alternative is not expressly described herein. For example, it is intended that the system of FIG. 2 can comprise an embodiment wherein the detector 30 may be also movable in the Z dimension. It is also contemplated that the system of FIG. 2 may further comprise a device at the inspection region, that may be responsive to the processor, that rotates the item under inspection to provide up to and including a 360° rotation of the item under inspection.

The controller 40 may be coupled to an operator interface 50 which may be configured to receive instructions from an operator, to allow the operator to, via the controller 40 and the operator interface 50, control movement of any and all of the X-ray source 28, the X-ray detector 30, and the conveyor 14. The controller 40 may also present the processed information, which may be in the form of, for example, an X-ray image to the operator interface 50 to be accessed by an operator. The controller 40 and the operator interface 50 may further be coupled to a network connection 34 that allows information, such as, the processed information to be transmitted to, and received from, a remote location. A remote inspection device 104 may be located at the remote location. It is to be appreciated that the network connection can be any communication network, such as, an intranet within an airport facility and the internet, and that the remote inspection device 104 can be any remote device such as an operator interface remote from the system 24 but within the airport facility or an operator interface at another airport facility.

According to one embodiment of the X-ray inspection system 24, the controller 14 may comprise any of a central processing unit 42, a data interface 44, a control interface 46, and a display interface 48. The operator interface 50 may comprise operator controls 52 and a display 54. The central processing unit 42 may be coupled to the operator controls 52 so that by manipulating the operator controls 52 an operator can provide input signals to the central processing unit 42. The central processing unit 42 may also be coupled to the control interface 46, which in turn may be coupled to actuators (not illustrated) associated with the X-ray source 28, the X-ray detector 30, and the conveyor 14. Control signals may be sent from the central processing unit 42 through the control interface 46 to the actuators via control signals on lines 27, 29 and 25 to respectively control movement of the X-ray source 28, the X-ray detector 30, and the conveyor 14. The central processing unit 42 may also be coupled to a data interface 44. The data interface 44 may be configured to receive detection information from the X-ray detector 30 on line 35, and to transfer it to the central processing unit 42 where it may be processed before being transferred to the operator interface 50. The display interface 48 may also be coupled to the central processing unit 42 and may be configured to receive processed information from the central processing unit 42 and provide the processed information in a suitable format to the operator interface 50, for example in the form of an X-ray image. The X-ray image can be displayed on the display 54, for access by an operator.

It is to be appreciated that although the system of FIG. 2 is illustrated as comprising a conveyor 14, a corresponding actuator (not illustrated), and is coupled to controller 40, the system of FIG. 2 can be provided without a conveyor and can be configured to be adapted to an existing conveyor device. For example, where the system of FIG. 2 is to be used at an airport already having a conveyor system, the system of FIG. 2 can be configured to work with and interface to the existing conveyor system.

Figure 3B:
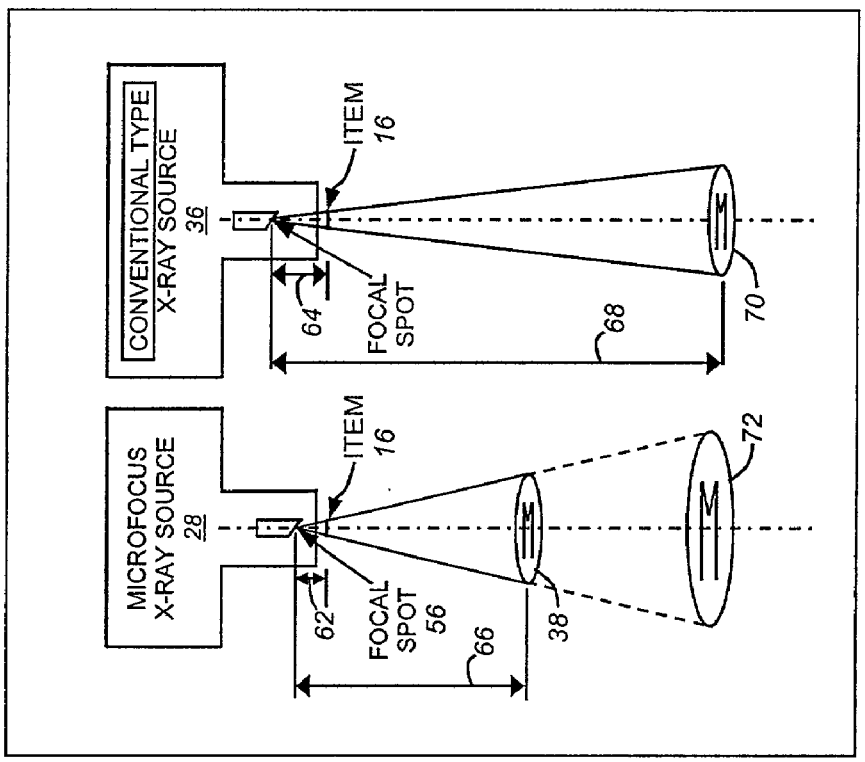
FIGS. 3a and 3b are diagrams illustrating image clarity and focal length advantages and characteristics of a high resolution X-ray source that may be used in the X-ray inspection system of FIG. 2.
Figure 3A:
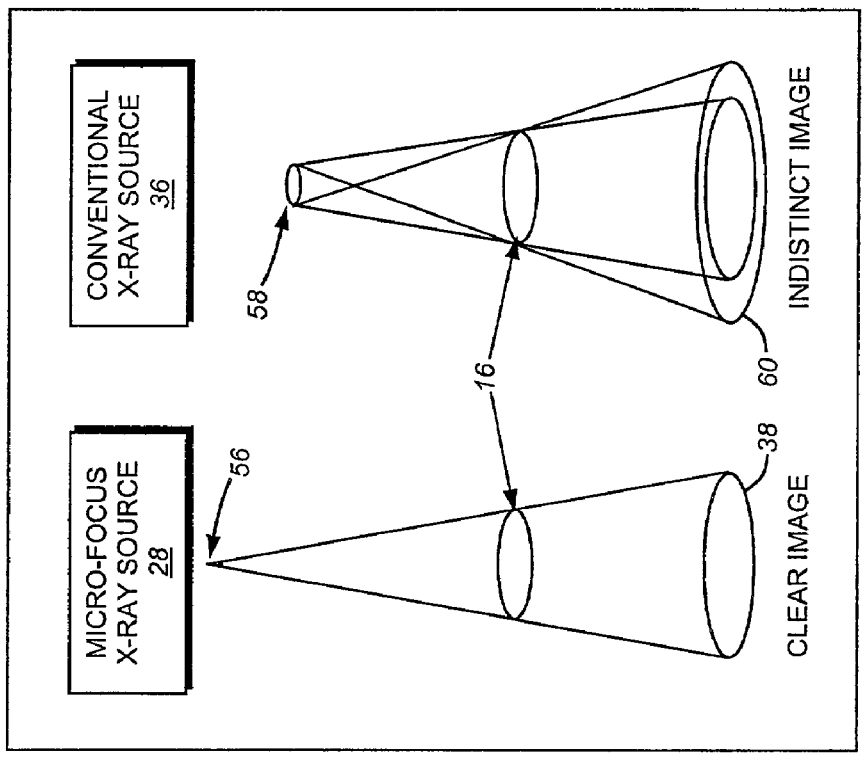

Referring to FIG. 3, according to one embodiment of the X-ray inspection system, the X-ray source 28 (see FIG. 2) may be a high resolution, micro-focus X-ray source having a focal spot size 56 less than approximately 100 μm. In another embodiment, the high resolution X-ray source may have a focal spot size 56 that is less than approximately 20 μm. In yet a another embodiment, the high resolution X-ray source may have a focal spot size less than approximately 12 μm. The high resolution X-ray source may be used in conjunction with a high resolution X-ray detector to provide a high resolution X-ray inspection system. FIGS. 3a and 3b illustrate two advantages and characteristics of a micro-focus X-ray source 28 as compared to a conventional X-ray source 36.

FIG. 3a illustrates an effect on clarity of an X-ray image using a high-resolution X-ray source 28 that has a small focal spot 56 (for example, less than 100 μm), as opposed to a conventional X-ray source 36 that has a focal spot 58 size of approximately 300 μm. The magnification and resolution of an X-ray image 38 provided by an X-ray source may be determined, at least in part, by the focal spot size of the X-ray source. As shown in FIG. 3a, a smaller focal spot size 56 can result in a higher resolution, clearer image 38 of an item 16 than can be obtained when the item 16 is exposed by a conventional X-ray source 36 having a larger focal spot size 58, where the sources are located the same distance away from the item 16. The larger size of the focal spot 58 of the conventional X-ray source 36 may cause some cross-over of the X-ray radiation, resulting in an indistinct image 60.

FIG. 3b illustrates a second characteristic and advantage of a micro-focus X-ray source 28. The micro-focus X-ray source 28 may have a shorter focal length 62 than the focal length 64 of the conventional X-ray source 36. Because of this shorter focal length 62, two distances may be reduced, allowing, for example, for a more compact instrument package. First, for an image of the same magnification, distance 66 from the microfocus X-ray source 28 to image 38 may be reduced compared with the distance 68 from the conventional source 36 to the image 70. Second, the shorter focal length 62 may allow the item under inspection 16 to be placed closer to the X-ray source 28. Since the X-ray magnitude increases (is not as attenuated) as the distance from the X-ray source 28 to the item under inspection 16 decreases, the microfocus X-ray source 28 may provide a greater magnitude of X-ray radiation to the item 16 for an image with the same magnification as the conventional source 36, and may thereby produce a sharper, clearer, and higher resolution X-ray image. Because of the characteristics of the micro-focus X-ray source 28 discussed above, the microfocus X-ray source 28 can also provide greater magnification images of the item 16. As shown in FIG. 3b the micro-focus X-ray source 28 can provide an image 72 that may be of significantly greater magnification than image 70 produced by the conventional source 36 at the same distance from the source.

According to the embodiments that have been described infra, the X-ray source 28 (see FIG. 2) may be a single energy X-ray source. According to another embodiment, the X-ray source may be a dual energy X-ray source. A dual-energy X-ray source may produce high energy X-ray radiation and low energy X-ray radiation. A dual-energy X-ray source, X-ray inspection system and methodology using the dual energy X-ray source, is disclosed in U.S. Pat. No. 5,319,547 (the '547 patent), which is incorporated herein by reference. It is to be appreciated that the dual-energy X-ray source and system of the '547 patent can be modified as described herein to provide an X-ray system and methodology at dual energy levels.

Figures 4A, 4B:
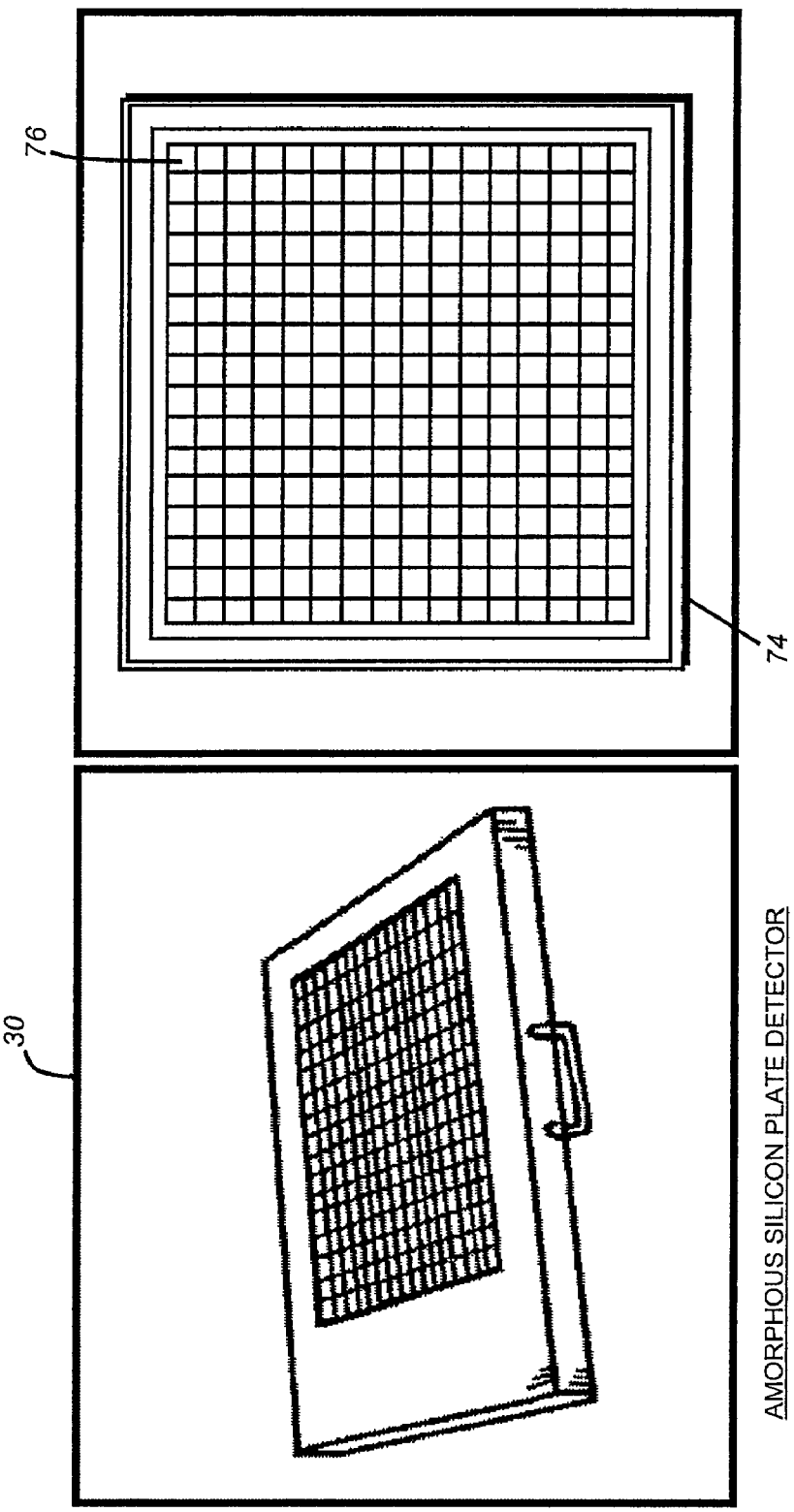

FIGS. 4a and 4b illustrate, in perspective and plan view, an embodiment of the X-ray detector 30 that may be used in the X-ray system (see FIG. 2). The X-ray detector 30 may be a radiation image detector such as a PerkinElmer RID 1640. The X-ray detector 30 may be a flat panel sensor 74 fabricated using thin film technology including amorphous silicon on glass panels. The panel sensor 74 may be a square image sensing photodiode array with 1024×1024 pixels. Each pixel 76 of the X-ray detector array may consist of a light sensing photodiode and a switching thin film transistor formed with the amorphous silicon technology.

For this embodiment of the X-ray detector, the amorphous silicon photodiodes are sensitive to visible light. This light-sensitive photodiode array may be coupled to a scintillation material which responds to X-rays. When striking the scintillator, the X-rays are converted to visible light which may be detected by the photodiodes and transformed into electrical signals. The sensitivity of amorphous silicon photodiodes peaks in the green light spectrum, which is well matched to scintillators made of a material, such as, Cs1 or $Gd_2O_2S:Tb$, which is commercially available as a LANEX® fine scintillator from, for example, Kodak. The amorphous silicon panel itself is substantially immune to damage from large doses of X-rays. This feature makes the X-ray detector array suitable for use in an inspection system, such as a baggage inspection system at an airport, where a large number of items are inspected at a high throughput rate, and the detector is thus continually exposed to X-ray radiation. It is also suitable for use in combination with a dual energy X-ray source, such as disclosed above, where the source may frequently emit high-energy and low energy X-ray radiation.

Figure 5:
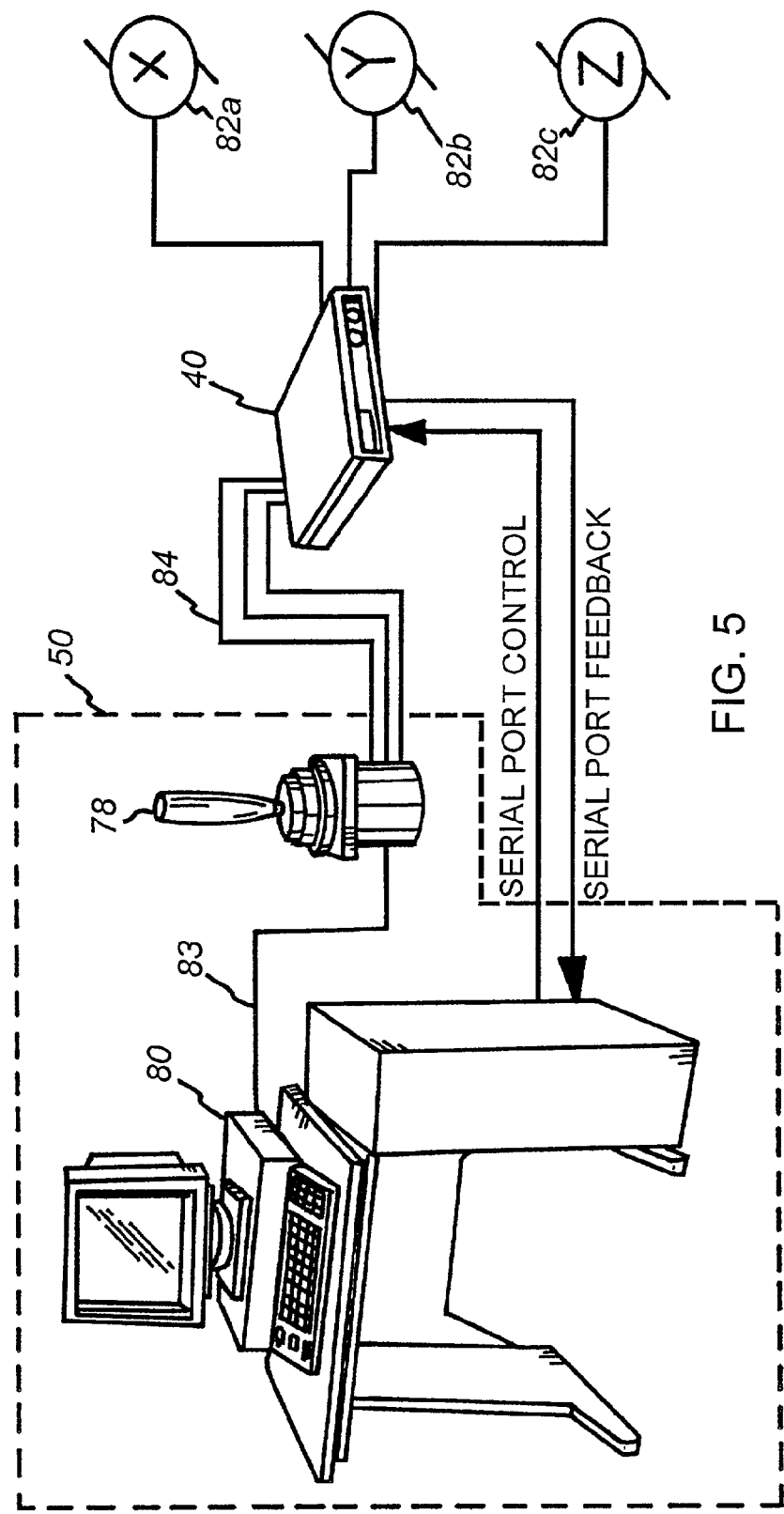
FIG. 5 is a block diagram of one embodiment of a controller and operator interface that may be used in the X-ray inspection system of FIG. 2.

FIG. 5 illustrates an embodiment of the controller 40 and operator interface 50 (see FIG. 2). In this embodiment, operator interface 50 may comprise a joystick 78 coupled the controller 40 via lines 84. In an alternative embodiment, the joystick 78 may ultimately be coupled to controller 40 through computer 80 via line 83. The controller 40 may also be coupled to linear actuators 82a–c and may effect movement of any one of the X-ray source, the X-ray detector, and the conveyor in any of the first, second and third dimensions. By manipulating the joystick 78, the operator may provide the control signals over lines 84 to controller 40, which can activate the linear actuators 82a–c to move the conveyor to move the item under inspection in the x dimension, to move the X-ray source in any of the x, y and z dimensions, and/or to move the X-ray detector in the x and y dimensions to the desired position. It is to be appreciated that although there is illustrated one actuator for each dimension (x, y, z) to control movement of each of the X-ray source, the X-ray detector and the conveyor, there may be provided more than one separate actuator for each dimension and for each device to be moved by the actuators.

According to another embodiment, the controller 40 may receive information from computer 80 operating under a process executed by the computer 80, to automatically move the X-ray source, the X-ray detector, and/or the conveyor to move the item under inspection, without necessary intervention by an operator.

Figure 6:
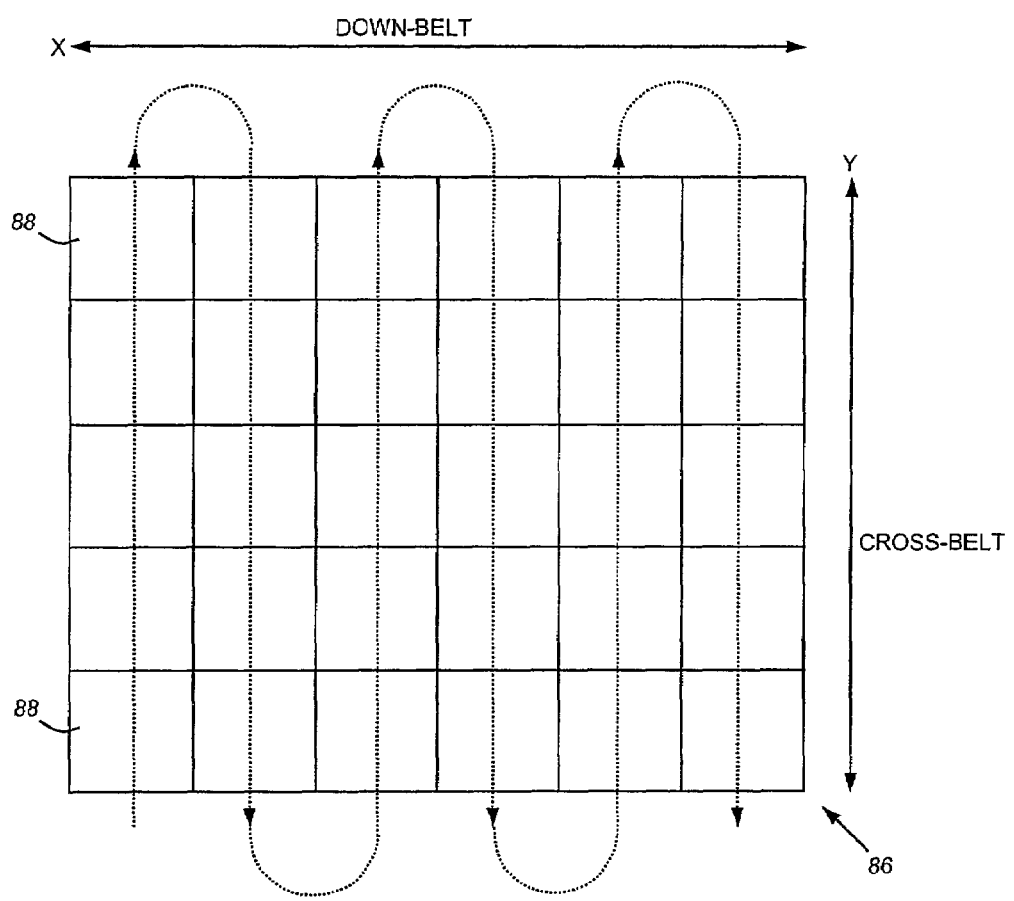
FIG. 6 is a schematic representation of movement of one or both of the X-ray source and X-ray detector to create a tiled scout view that may be provided by the system of FIG. 2.

FIG. 6 illustrates an example movement of either one or both of the X-ray source 28 and X-ray detector 30 to create a tiled scout view that can be provided by the system of FIG. 2. According to one embodiment, the controller 40 may move any of the X-ray source 28, the X-ray detector 30, and the conveyor 14, to a plurality of positions in order to create the tiled scout view 86 of the item under inspection. Referring to FIG. 6, there is illustrated an example of movement of the X-ray source and the X-ray detector, which may be moved collinearly to a number of sequential positions, where an image is recorded at each position. In one embodiment, the conveyor, and thus the item, is held stationary during the automatic inspection process and the tiled scout view 86 may comprise an array of 30 measurements comprising five tiles in the cross-belt direction and six tiles in the down-belt direction. Each tile 88 may represent a 1024×1024 image, which may cover a 0.2 m×0.2 m area on the belt. According to another embodiment of the system of FIG. 2, the controller 40 may move the X-ray source 28 and the X-ray detector 30 independently of each other to provide a plurality of X-ray views of the item under inspection at varying examination angles of the X-ray radiation that are provided by independent location of the X-ray source and the X-ray detector. In particular, the X-ray source and the X-ray detector can be moved independently to measure the item under inspection at numerous angles and along a plurality of planes or slices created by the independent locations of the source and detector.

Figure 7:
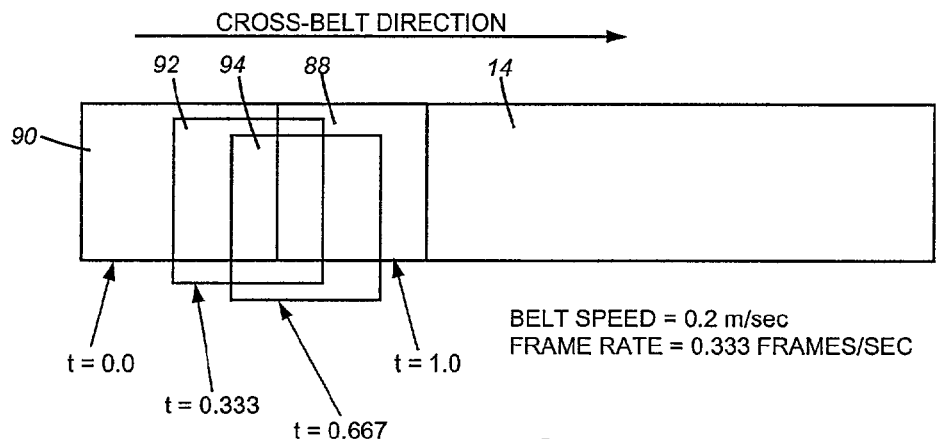
FIG. 7 is a schematic representation illustrating the movement of one or both of the X-ray source and X-ray detector to create a tiled scout view when the item under inspection is moving.

FIG. 7 illustrates an example of movement of any or both of the X-ray source and/or the X-ray detector of FIG. 2, when the item under inspection is moving, to create a tiled scout view. It is to be appreciated that in one embodiment during the inspection process, the conveyor 14 may continue to move the item under inspection through the region of inspection, such as, at a reduced speed, and that this movement of the item may be accounted for in the tiling process. FIG. 7 illustrates a plurality of measurements that can be used to create the tiled scout view if the item is moving during the inspection process. A tiled row of a composite image can be constructed by taking a first ⅔ of a first frame 90 and a last ⅔ of a last frame 94 to form the left and right edges of a portion of the tiled scout view, and taking a middle third of each intermediate frame 92 to create the interior of each tile 88 of the portion of the tiled scout view. This procedure may yield a tiled scout view that is five tiles in the cross-belt direction and six tiles in the down-belt direction. The resulting composite image may be 6144×5120 pixels in size. This composite image may be down-sampled by six in both directions to yield a composite tiled scout view that may be 1008×850 pixels.

Figure 8:
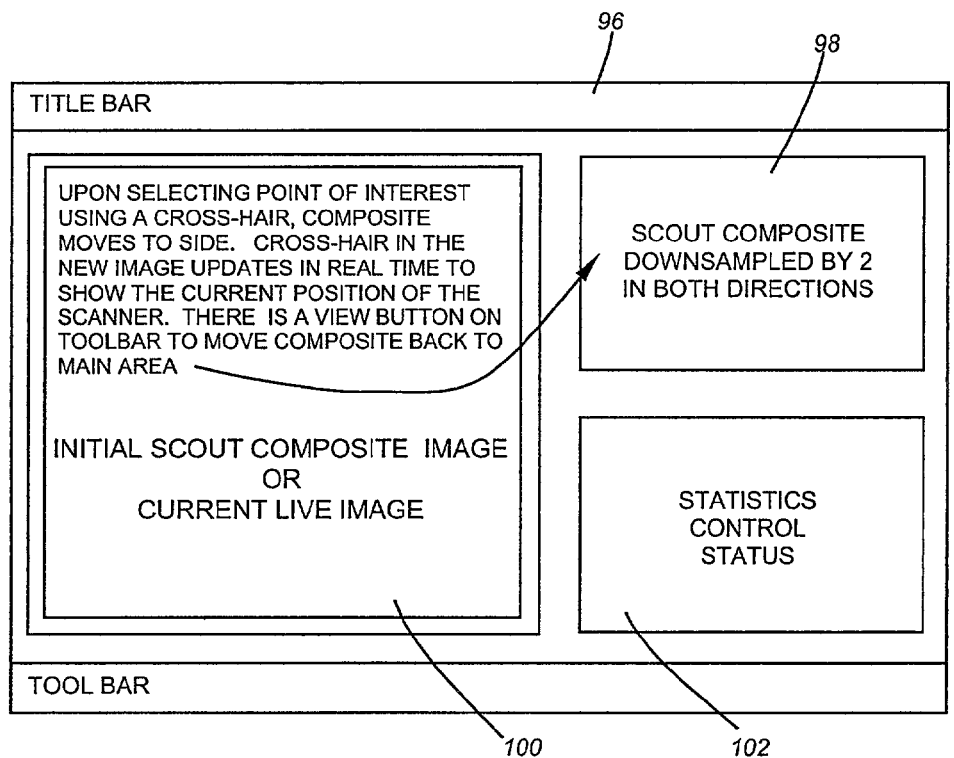
FIG. 8 is an example of an operator interface that may be used in the X-ray inspection system of FIG. 2.

FIG. 8 illustrates an example of an operator interface 96 according to one embodiment. The tiled scout view may be provided by the controller to the operator interface for possible analysis by an operator and may be, for example, displayed by the operator interface on computer 80 (see FIG. 5), or on display 54 (see FIG. 2). In this embodiment of the operator interface 96, the tiled scout view may be continuously displayed in one area 98 of the display, while an image in a main display area 100 may be modified by an operator. For example, at the start of an inspection process, the initial tiled scout view may be displayed in the main display area 100. If an operator, or the controller, locates a region of interest in the tiled scout view, the operator may select this region of interest for further inspection. The region of interest may then be displayed in the main display area 100, and the tiled scout view may be displayed in area 98. The operator may further direct the controller, such as via the operator interface, to move the X-ray source in the third dimension (z-dimension) closer to, or further away from, the item under inspection 16 (see FIG. 2) to provide a zoomed image of the region of interest. The zoomed image may be obtained by moving the X-ray source closer to the item under inspection. The operator may then inspect the region of interest in greater detail. The operator may also bring the tiled scout view back to the main display area 100 by manipulating an appropriate control on the operator interface. Various statistics and information regarding the system may also be displayed in a display area 102. For example, display area 102 may display information such as online/offline status of screening devices, operator workload, number of bags screened per hour, percentage of bags rejected, etc. It is to be appreciated that another embodiment of an operator interface that may be used in the X-ray system is described in detail in U.S. Pat. No. 5,870,449, which is incorporated herein by reference.

Figure 9A:
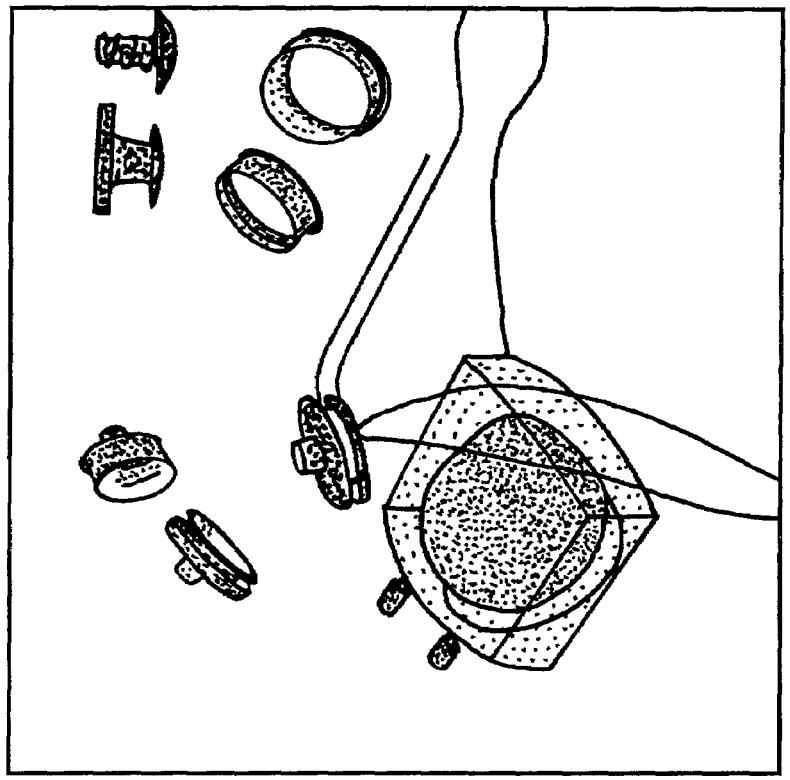
FIG. 9a is an example of an X-ray images that may be provided by the X-ray inspection system of FIG. 2.
Figure 9B:
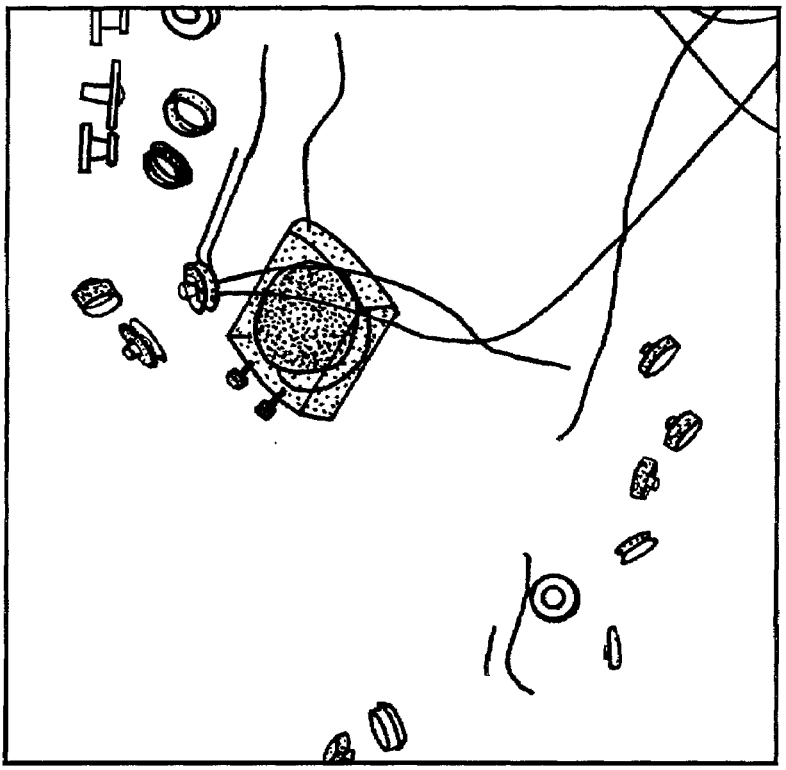
FIG. 9b is another example of an X-ray image that may be provided by the X-ray inspection system of FIG. 2.

Referring to FIGS. 9a and 9b, there are illustrated examples of X-ray images that may be provided by the X-ray inspection system of FIG. 2. FIG. 9a, illustrates an example image of a region of interest within an item under inspection. Referring to FIG. 9a, it is illustrated that a suspect device containing wires has been detected. FIG. 9b illustrates an example of a zoomed image of the item of FIG. 9a, that may be obtained by moving the X-ray source in the third dimension closer to the item. The zoomed image may provide more detail of materials within the item.

According to another embodiment, the controller 40 may receive information about the item under inspection from a remote inspection device 104 (see FIG. 2). The remote inspection device 104 may be, for example, a level one or level two threat detection system, or an inspection device at a location different from the location of the X-ray inspection system. The controller 40 may be configured to automatically position any or all of the X-ray source, the X-ray detector, and the conveyor to position the item under inspection, so as to inspect a region of interest in the item under inspection based on the information received from the remote inspection device 104, including a region of interest previously identified by the remote inspection device 104. The information received may be an X-ray image of the item under inspection obtained by the remote inspection device showing a region of interest in the item, and the controller may provide the image received from the remote inspection device as well as the tiled scout view of the item under inspection to the operator interface 50.

According to one embodiment, an operator may compare the tiled scout view with an image from the remote inspection device 104 to locate the region of interest in the item under inspection. However, it is to be appreciated that the item may shift in orientation during its move from the remote inspection device to the present inspection region, and therefore it may not be straightforward for the operator to locate the region of interest in the tiled scout view. Therefore, the controller 40 may also be configured to automatically compare the image obtained from the remote inspection device with the tiled scout view to locate the region of interest.

Figure 10:
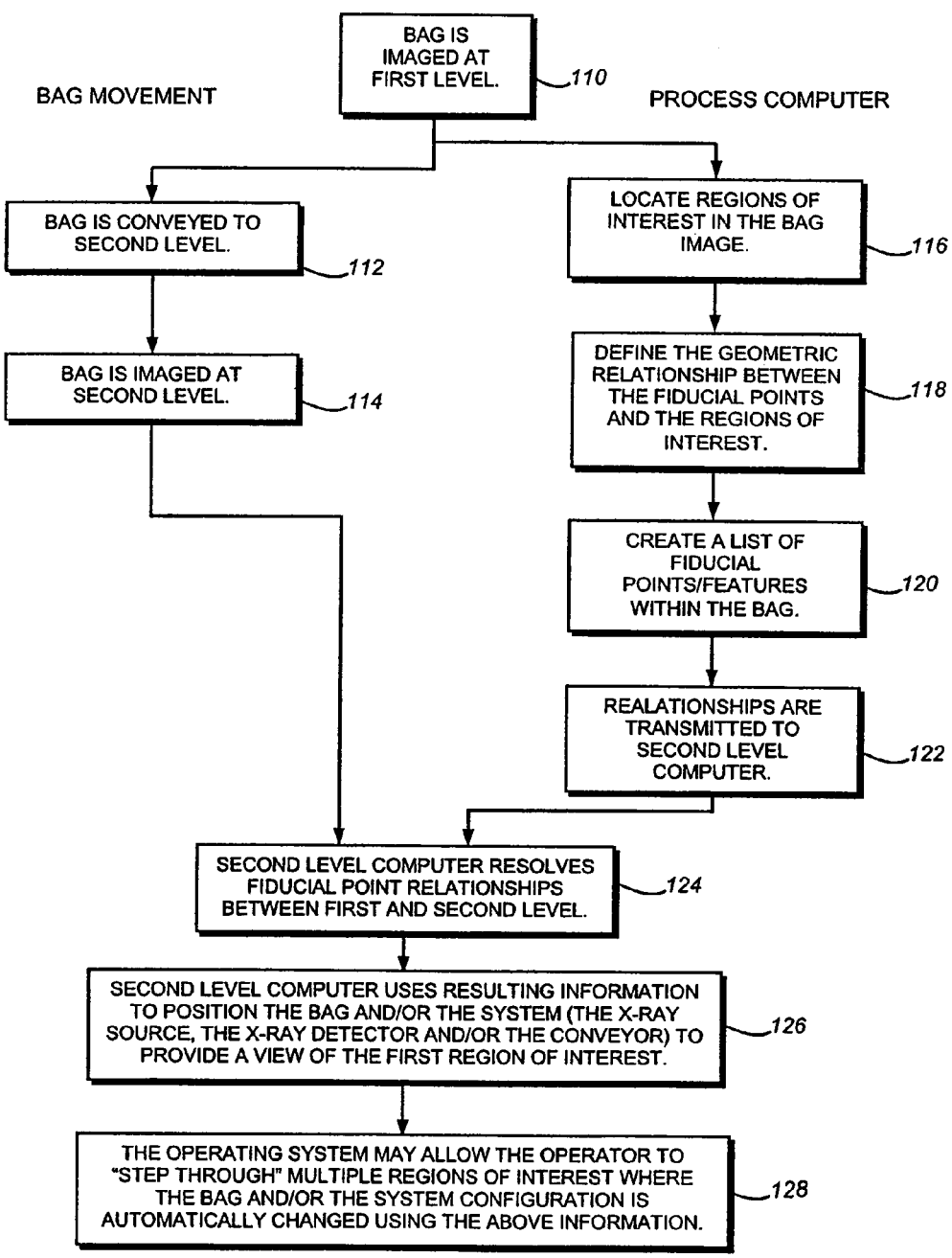
FIG. 10 is a flow diagram illustrating one embodiment of a method for locating a region of interest in a tiled scout view of an item under inspection, based on a region of interest located in another image of the item.

Referring to FIG. 10, there is illustrated one embodiment of a process for locating a region of interest in the tiled scout view based on a previously located region of interest from a remote inspection device. The item may be imaged at, for example, a first level (step 110). The item may then be conveyed to, for example, a second level (step 112) at which may be located the X-ray inspection system 24 (see FIG. 2), and imaged by the X-ray inspection system (step 114). This imaging may produce a tiled scout view of the item. The controller may locate a region of interest in the image provided by the first level inspection device (step 116). However, the item may have been translated, rotated, or otherwise shifted in orientation during its conveyance from the first level to the second level.

The X-ray inspection system may use fiduciary data regarding the item in order to reconcile the image of the item provided by the remote inspection device with the tiled scout view of the item. For example, an "Affine" transformation or similar transformation process, as known to those of skill in the art, may utilize the fiduciary data to account for rotation of the item in a plane of the conveyor, translation of the item, and magnification in the z-dimension by the system. The controller may locate at least two fiducial points within the image from the remote inspection device. It is to be understood that the term "fiducial points" are so called because they are points that remain "faithful" from one image of the item to the next, even if the item shifts in orientation between the two images. Some examples of objects in an item that may be suitable fiducial points may be a metal button, a metal zipper clasp, a wheel, or another small, dense object. At least two fiducial points may be used to resolve rotation and translation in the x-dimension of the item, and three fiducial points may be used to additionally resolve translation of the item in the y-dimension. However, additional fiducial points such as up to twenty fiducial points, may be located in the image and used to ensure that at least some of these fiducial points may be located in the tiled scout view (some fiducial points that may be located in the image may be obscured in the tiled scout view). Once the at least two fiducial points have been located in the image, the controller may define a geometric relationship, such as, for example, a distance between the fiducial points (step 118). The controller may locate the corresponding two fiducial points in the tiled scout view of the item, and may resolve the fiducial point relationships between the image and the tiled scout view (step 124) to reconcile the image provided by the remote inspection with the tiled scout view, and to locate the region of interest in the tiled scout view.

In an alternative embodiment, steps 116 and 118 may be performed by a remote processor associated with the remote inspection device. According to such embodiment, the remote processor may create a list of fiducial data, such as, for example, the relationships between the fiducial points in the image of the item (step 120), and may transmit the data to the X-ray inspection system disclosed herein (step 122).

The controller may position the X-ray source, the X-ray detector, and/or the conveyor to position the item and to inspect the region of interest (step 126). According to one embodiment, an operator may position any of the item (the conveyor), the X-ray source and X-ray detector to view multiple regions of interest in the item (step 128). Alternatively, the controller may be configured to automatically position any of the X-ray source, the X-ray detector, and the conveyor to position the item and to view multiple regions of interest in the item, based on information received from the remote inspection device.

According to another embodiment, a region of interest located in an item under inspection may be subjected to a further, more detailed inspection by the system of FIG. 2 in addition to the X-ray measurement. This further inspection may include one or more additional X-ray inspections, such as, a coherent X-ray scatter analysis or a Computed Laminography scan. In this embodiment, the controller 40 (see FIG. 2) may also be configured to automatically position the X-ray source 28, the X-ray detector 30 and the conveyor 14, and therefore the item under inspection 16, as needed for the further inspection. This additional inspection may be done, for example, if an operator cannot clear an item based on the X-ray image alone.

Figure 11:
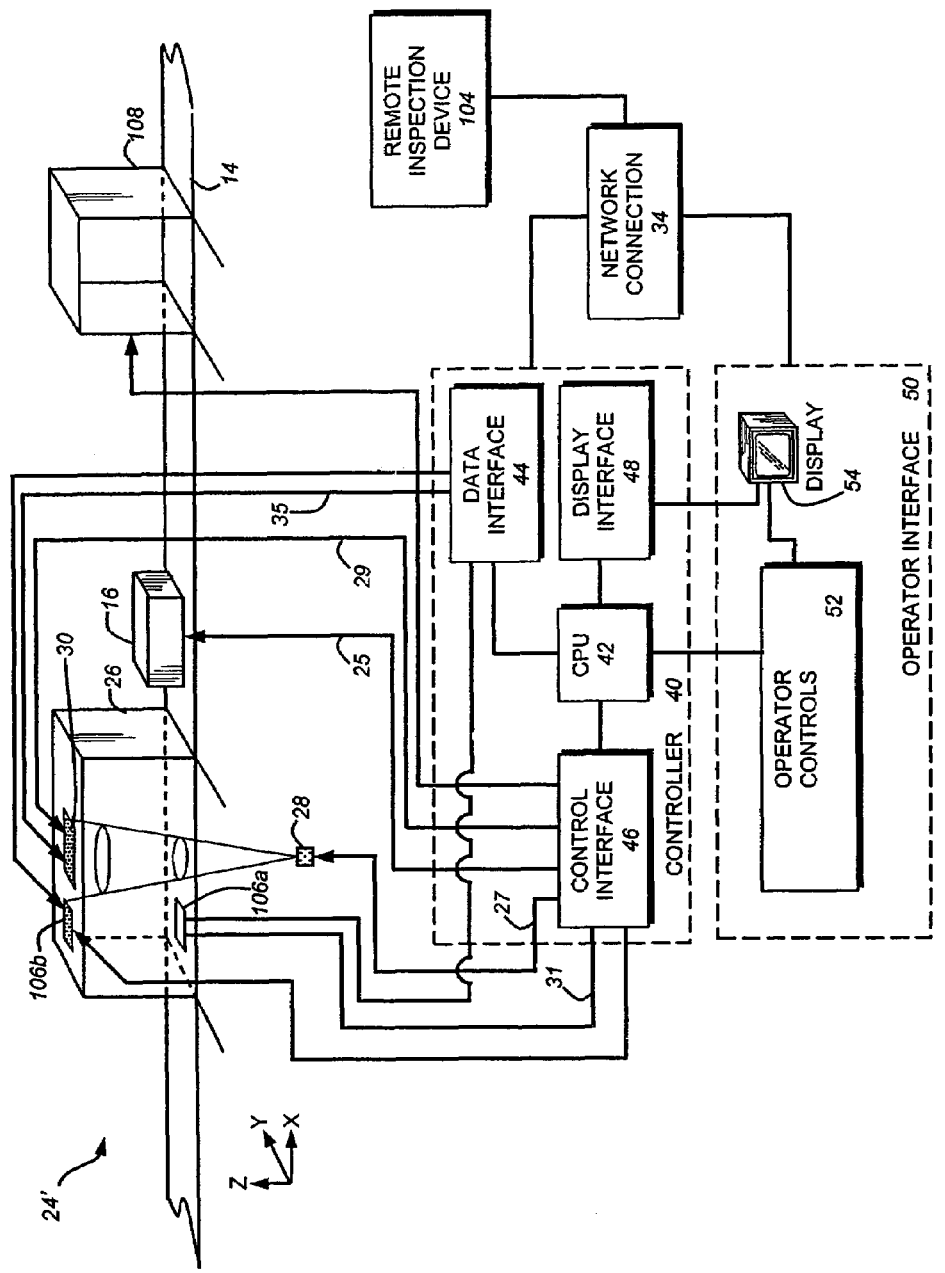
FIG. 11 is a schematic illustration of an X-ray inspection system according to another embodiment.

Referring to FIG. 11, this embodiment of the system may further comprise an energy sensitive detector 106a that detects X-ray radiation in a predetermined energy window that is scattered by the item under inspection. It is to be appreciated that some components of FIG. 11 are illustrated with the same reference numerals as the corresponding components of the system of FIG. 2, and that the operation of the components has already been discussed infra with respect to FIG. 2 and is therefore not repeated in this discussion of the embodiment of FIG. 11. The energy sensitive detector 106a may be configured to provide the coherent scatter information to the controller 40 via line 31, which may process the information and perform coherent X-ray scatter analysis. A coherent X-ray scatter analysis may measure additional properties of materials of the region of interest within the item under inspection, which may aid an operator or the system in making a decision on whether or not the item under inspection can be cleared. According to one embodiment, the X-ray scatter detector 106a may be disposed in the inspection region 26 so as to detect X-ray radiation back-scattered by the item. Alternatively, the X-ray scatter detector 106a may be disposed at the inspection region 26 at a different location so as to detect X-ray radiation scattered by the item under inspection at a selected angle. According to yet another embodiment, the X-ray inspection system may comprise two or more X-ray scatter detectors 106a, 106b disposed at different locations at the inspection region 26, so as to detect X-ray radiation scattered at different angles by the item under inspection.

Alternatively, the X-ray source 28 and the X-ray detector 30 of the X-ray inspection system 24 may be adapted to perform a Computed Laminography scan of the region of interest. For example, the controller 40 may be configured to suitably position and control movement of any of the X-ray source 28, the X-ray detector 30 and the conveyor 14 to move the item 16, to perform the Computed Laminography scan. It is to be understood that Computed Laminography is a measurement technique and process for measuring detailed X-ray images of one or more predetermined planar sections of an item under inspection, while not focussing on images of other planes with the measurement. A Computed Laminography scan may provide a better image of the item and remove clutter either underlying or overlying a region of interest, thereby enabling an operator to more clearly see the region of interest in the image. It is to be appreciated that the system of FIG. 11 can be adopted to perform a computed Laminography scan by, for example, using the process of U.S. Pat. No. 5,490,218 herein incorporated by reference.

In another embodiment, the X-ray inspection system 24, 24' may also be used in conjunction with a computed tomographic (CT) scanner 108 (See FIG. 11). The CT scanner 108 may be used to provide information about the three-dimensional spatial configuration of materials within the item under inspection, but typically takes a long time to process each CT scan, and is therefore not ideally suited to many applications that require efficient, real-time scanning of the item (such as, baggage inspection at airports). Coupling the CT scanner 108 with the X-ray inspection system 24 may increase the efficiency of the item inspection. For example, the X-ray inspection system 24 may be used to identify a region of interest in the item under inspection that warrants a further, more detailed inspection by the CT scanner 108. Positional information regarding the location of the region of interest in the item may be provided by the controller 40 of the X-ray inspection system 24 to the CT scanner 108, which may then perform a CT scan on the identified region of interest. Since this region of interest is typically significantly smaller than the whole item under inspection, the time required for the CT scan may be reduced, thereby making the combined X-ray inspection system 24, 24' and CT scanner feasible for use in the above-mentioned types of applications.

It is to be appreciated that with the various embodiments of X-ray inspection system disclosed herein, the item under inspection may also be transferred to a remote location for further inspection, should additional equipment be required for the inspection. However, it should be appreciated that with the system disclosed herein this should not be necessary since the X-ray inspection system is intended to provide detailed images that are sufficient to detect any contraband under most circumstances, and is also configured to perform most additional scanning (if necessary) at the same location.

As was discussed infra, according to one embodiment, the X-ray inspection system 24, 24' may include a network connection 34 (see FIG. 2 and FIG. 11) that couples the system to a network such as, for example, the Internet, a local area network, or a public telephone network. It is to be appreciated that for this embodiment, the controller may be configured to provide the processed information, such as X-ray images, to a remote operator interface 104 (see FIG. 1), or to receive instructions from the remote operator interface 104, via the network 34. This network allows, for example, remote operators to view data or images obtained by the system, to oversee or direct the inspection process, or to identify items that need be inspected when they arrive at the remote location. Examples of remote operators may include a local police bomb squad, or a customs official at an airport destination of the item under inspection.

Having thus described several illustrative embodiments, various alterations, modifications and improvements will readily occur to those skilled in the art. Such alterations, modifications, and improvements are intended to be within the spirit and scope of the invention. Accordingly, the foregoing description is by way of example only and is not intended as limiting.

What is claimed is:

1. An X-ray inspection system that examines an item under inspection located at an inspection region, the system comprising:
    an X-ray source located at the inspection region that exposes the item under inspection to X-ray radiation, and that is constructed and arranged to be movable in any of a first dimension, a second dimension and a third dimension;
    an X-ray detector located at the inspection region that detects X-ray radiation as modified by the item under inspection, and that is constructed and arranged to be movable in the first dimension and the second dimension;
    a controller coupled to each of the X-ray source and the X-ray detector, that controls movement of the X-ray source and the X-ray detector in the first and second dimensions;
    a processor coupled to the controller that is configured to receive detection information from the X-ray detector, to process the detection information, and to provide processed information;
    wherein the controller is also configured to control movement of the X-ray source and the X-ray detector independently of each other in any of collinear directions and different directions to provide a plurality of X-ray views of the item under inspection at varying examination angles of the X-ray radiation;
    wherein the controller further comprises a central processing unit;
    wherein the processor is configured to process the plurality of X-ray views to create a tiled scout view of the item under inspection; and
    and wherein the processor is further configured to receive information about the item under inspection from a remote inspection device and to locate a region of interest in the item under inspection based on the information received.

2. The X-ray inspection system as claimed in claim 1, wherein the controller is additionally configured to control movement of the X-ray source in the third dimension so as to provide varying levels of zoom of the processed information.

3. The X-ray inspection system as claimed in claim 1, further comprising an operator interface, coupled to the controller and the processor, that is configured to receive instructions from an operator input, to provide the instructions to the controller to control the movement of any of the X-ray source and the X-ray detector, and that is configured to receive and to present the processed information to an operator.

4. The X-ray inspection system as claimed in claim 1, wherein the processor is configured to create the tiled scout view of an entire item under inspection.

5. The X-ray inspection system as claimed in claim 1, wherein the information about the item under inspection comprises an image, and the processor is further configured to compare at least two fiducial points in the image with at least two corresponding fiducial points in the tiled scout view and to align the image and the tiled scout view to locate the region of interest in the tiled scout view.

6. The X-ray inspection system as claimed in claim 1, wherein the controller is further configured to automatically position the X-ray source and the X-ray detector for a further inspection of the region of interest in the item under inspection, in response to the information received by the processor.

7. The X-ray inspection system as claimed in claim 1, further comprising an energy sensitive detector coupled to the processor, that detects X-ray radiation in a predetermined energy window that is scattered by the item under inspection, and wherein the processor performs a coherent scatter X-ray analysis of the item under inspection.

8. The X-ray inspection system as claimed in claim 1, further comprising a conveyor constructed and arranged to move the item under inspection in the first dimension to the inspection region, and wherein the controller is further configured to control movement of the conveyor in the first dimension.

9. The X-ray inspection system as claimed in claim 1, further comprising a linear actuator responsive to the controller and coupled to the conveyor, that moves the conveyor in the first dimension.

10. The X-ray inspection system as claimed in claim 1, wherein the X-ray source is constructed and arranged to expose the item under inspection with a cone-shaped beam of X-ray radiation.

11. The X-ray inspection system as claimed in claim 1, wherein the X-ray source has a focal spot size of less than 100 $\mu$m, so as to provide a high resolution X-ray inspection system.

12. The X-ray inspection system as claimed in claim 1, wherein the X-ray detector comprises a two-dimensional amorphous silicon X-ray detector array.

13. The X-ray inspection system as claimed in claim 1, further comprising a plurality of linear actuators responsive to the controller and coupled to each of the X-ray source and the X-ray detector, that move the X-ray source in any of the first, second and third dimensions, and move the X-ray detector in any of the first and second dimensions.

14. The X-ray inspection system as claimed in claim 1, wherein the X-ray source comprises a dual-energy source that emits low energy X-ray radiation and high energy X-ray radiation.

15. The X-ray inspection system as claimed in claim 1, wherein the processor is configured to determine an effective atomic number of a material within the item under inspection, based on a measured attenuation through the material of the high energy X-ray radiation and a measured attenuation through the material of the low energy X-ray radiation.

16. The X-ray inspection system as claimed in claim 1, wherein the controller is further configured to repeatedly move the X-ray source and the X-ray detector in a predetermined manner so as to perform a Computed Laminography measurement of the item under inspection.

17. The X-ray system as claimed in claim 1, wherein the processor is coupled to a network and is configured to provide the processed information to a remote operator interface via the network.

18. The X-ray system as claimed in claim 17, wherein the network comprises any one of the Internet, a public telephone network and a local area network.

19. An X-ray inspection system, comprising:
an X-ray source located at an inspection region that exposes an item under inspection to X-ray radiation, and that is constructed and arranged to be movable in any of the first dimension, a second dimension and a third dimension;
an X-ray detector located at the inspection region that detects X-ray radiation as modified by the item under inspection, and that is constructed and arranged to be movable in the first dimension and the second dimension;
a controller coupled to each of the X-ray source and the X-ray detector, that controls movement of the X-ray source and the X-ray detector in the first and second dimensions;
a processor coupled to the controller that is configured to receive detection information from the X-ray detector, to process the detection information, and to provide processed information;
wherein the controller is also configured to control movement of the X-ray source in the third dimension so as to provide varying levels of zoom of the processed information;
further comprising an operator interface, coupled to the controller and the processor, that is configured to receive instructions from an operator input, to provide the instructions to the controller to control the movement of any of the X-ray source and the X-ray detector, and that is configured to receive and to present the processed information to an operator;
wherein the controller is additionally configured to control movement of the X-ray source and the X-ray detector independently of each other, in any of collinear directions and different directions, to provide a plurality of X-ray views of the item under inspection at varying examination angles of the X-ray radiation;
wherein the controller further comprises a central processing unit;
wherein the processor is configured to process the plurality of X-ray views to create a tiled scout view of the item under inspection, and to provide the tiled scout view to the operator interface; and
wherein the processor is further configured to receive information about the item under inspection from a remote inspection device and to locate a region of interest in the item under inspection based on the information received.

20. The X-ray system as claimed in claim 19, further comprising a conveyor constructed and arranged to move the item under inspection in the first dimension to the inspection region, and wherein the controller is also configured to control movement of the conveyor in the first dimension.

21. A method of inspecting an item with an X-ray system, the method comprising acts of:
exposing the item to X-ray radiation from an X-ray source;
detecting the X-ray radiation modified by the item with an X-ray detector;
processing information provided by the X-ray detector to provide processed information;
moving the X-ray source in any of a first dimension and a second dimension to expose the item to X-ray radiation at a plurality of positions; and
moving the X-ray detector, independently of the X-ray source, in any of the first dimension and the second dimension to detect the X-ray radiation at a plurality of examination angles and independently of a conveyor;

further comprising acts of:

providing the processed information at the plurality of examination angles to an operator interface;

receiving from a remote inspection device information about the item;

locating a region of interest in the item based on the information received; and wherein the act of processing the information comprises creating a tiled scout view of the item from X-ray images obtained at each of the plurality of positions.

22. The method as claimed in claim 21, further comprising an act of moving the X-ray source in a third dimension so as to provide varying levels of zoom of the processed information.

23. The method as claimed in claim 21, further comprising an act of moving the item with the conveyor, in the first dimension to a region of inspection.

24. The method as claimed in claim 21, wherein the act of providing the processed information comprises providing the tiled scout view to the operator interface.

25. The method as claimed in claim 21, wherein the act of creating the tiled scout view comprises creating a tiled scout view of an entire item under inspection.

26. The method as claim on claim 21, wherein the information received comprises an image and the act of locating the region of interest in the item comprises acts of:

locating in the image at least two fiducial points;

locating in the tiled scout view at least two corresponding fiducial points;

aligning the tiled scout view with the image based on a location of the fiducial points; and locating the region of interest in the tiled scout view based on a location of the region of interest in the image.

27. The method as claimed in claim 21, further comprising an act of automatically positioning the X-ray source and the X-ray detector for a further inspection of the region of interest, in response to the information received.

28. The method as claimed in claim 21, wherein the act of exposing the item to X-ray radiation comprises an act of exposing the item to a cone-shaped beam of X-ray radiation.

29. The method as claimed in claim 21, wherein the act of exposing the item to X-ray radiation comprises exposing the item to X-ray radiation from an X-ray source having a focal spot size of less than 100 $\mu$m.

30. The method as claimed in claim 21, wherein the act of exposing the item to X-ray radiation comprises exposing the item to high energy X-ray radiation and exposing the item to low energy X-ray radiation.

31. The method as claimed in claim 30, wherein the act of processing the information comprises:

measuring a first attenuation of the high energy X-ray radiation;

measuring a second attenuation of the low energy X-ray radiation; and determining an effective atomic number of a material within the item based on the first and second attenuation.

32. The method as claimed in claim 21, wherein the acts of moving the X-ray source and moving the X-ray detector comprise repeatedly moving the X-ray source and the X-ray detector in a predetermined manner so as to perform a Computed Laminography measurement of the item.

33. The method as claimed in claim 21, further comprising acts of:

detecting with an energy sensitive detector, X-ray radiation scattered by the item; and performing a coherent scatter X-ray analysis of the item.

34. The method as claimed in claim 21, further comprising an act of providing the processed information to a remote operator interface.

35. A method of inspecting an item with an X-ray inspection system, the method comprising acts of:

exposing the item to X-ray radiation from an X-ray source;

detecting the X-ray radiation modified by the item with an X-ray detector;

processing information provided by the X-ray detector to provide processed information;

moving the X-ray source in any of a first dimension and a second dimension to expose the item to X-ray radiation at a plurality of positions;

moving the X-ray detector in any of the first dimension and the second dimension to detect the X-ray radiation at a plurality of positions; and moving the X-ray source in a third dimension so as to provide varying levels of zoom of the processed information;

moving a conveyor independently of the X-ray source and the X-ray detector;

further comprising acts of:

receiving from a remote inspection device information about the item; and locating a region of interest in the item based on the information received.

36. The method as claimed in claim 35, further comprising an act of providing the processed information to an operator interface.

37. The method as claimed in claim 35, wherein the act of moving the X-ray detector comprises moving the X-ray detector independently of the X-ray source, so as to detect the X-ray radiation at a plurality of examination angles and so as to provide the processed information at the plurality of examination angles.

38. The method as claimed in claim 37, wherein the act of processing the information comprises creating a tiled scout view of the item from X-ray images obtained at each of the plurality of positions; and wherein the act of providing the processed information comprises providing the tiled scout view.

39. The method as claimed in claim 35, further comprising an act of moving the item with the conveyor, in a first dimension to a region of inspection.

* * * * *

UNITED STATES PATENT AND TRADEMARK OFFICE
CERTIFICATE OF CORRECTION

PATENT NO. : 6,968,034 B2
DATED : November 22, 2005
INVENTOR(S) : Michael P. Ellenbogen It is certified that error appears in the above-identified patent and that said Letters Patent is hereby corrected as shown below:

<u>Title page,</u>
Item [75], Inventor, change "Ellengogen" to -- Ellenbogen --.

Signed and Sealed this

Thirty-first Day of January, 2006

JON W. DUDAS
*Director of the United States Patent and Trademark Office*